United States Patent
Wang et al.

(10) Patent No.: US 11,961,955 B2
(45) Date of Patent: Apr. 16, 2024

(54) METHOD AND APPARATUS FOR MANUFACTURING ELECTRODE ASSEMBLY OF SECONDARY BATTERY

(71) Applicant: Contemporary Amperex Technology Co., Limited, Ningde (CN)

(72) Inventors: Yiruo Wang, Ningde (CN); Zhiyang Wu, Ningde (CN); Xiao Wang, Ningde (CN); Chengcheng Jiang, Ningde (CN); Chao Xie, Ningde (CN); Liangzhen Dai, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/712,087

(22) Filed: Apr. 2, 2022

(65) Prior Publication Data

US 2022/0223897 A1    Jul. 14, 2022

Related U.S. Application Data

(63) Continuation of application No. PCT/CN2020/114503, filed on Sep. 10, 2020.

(30) Foreign Application Priority Data

Oct. 10, 2019 (CN) .......................... 201910957293.5

(51) Int. Cl.
*H01M 10/04* (2006.01)
*H01M 10/0525* (2010.01)
(Continued)

(52) U.S. Cl.
CPC ... *H01M 10/0409* (2013.01); *H01M 10/0431* (2013.01); *H01M 10/0468* (2013.01); *H01M 50/103* (2021.01)

(58) Field of Classification Search
CPC ............. H01M 10/04; H01M 10/0469; H01M 10/0468; H01M 10/0431
See application file for complete search history.

(56) References Cited

U.S. PATENT DOCUMENTS

| | | | | |
|---|---|---|---|---|
| 2,081,943 | A | * | 6/1937 | Lund ........................ H01M 4/20 141/153 |
| 2006/0073380 | A1 | | 4/2006 | Kim et al. |

(Continued)

FOREIGN PATENT DOCUMENTS

| | | |
|---|---|---|
| CN | 104253286 A | 12/2014 |
| CN | 105355962 A | 2/2016 |

(Continued)

OTHER PUBLICATIONS

Machine Translation of: KR 1020110092463 A, Gyu et al., Aug. 18, 2011.*

(Continued)

*Primary Examiner* — Kenneth J Douyette
(74) *Attorney, Agent, or Firm* — East IP P.C.

(57) ABSTRACT

The present application relates to a method and an apparatus for manufacturing an electrode assembly of a secondary battery. Embodiments of the present application propose a method for manufacturing an electrode assembly of a secondary battery, the method comprising joining a positive electrode plate and a first separator to form a positive electrode composite plate body; joining a negative electrode plate and a second separator to form a negative electrode composite plate body; winding the positive electrode composite plate body and the negative electrode composite plate body together to form an electrode assembly, wherein the positive electrode plate and the negative electrode plate are disposed to isolate from each other by the first separator and the second separator.

8 Claims, 3 Drawing Sheets

(51) Int. Cl.
H01M 50/10 (2021.01)
H01M 50/103 (2021.01)

(56) References Cited

U.S. PATENT DOCUMENTS

| | | | |
|---|---|---|---|
| 2011/0010928 A1 | 1/2011 | Tsuchiya et al. | |
| 2011/0297780 A1* | 12/2011 | Feng | H01M 10/0409 242/444 |
| 2013/0111739 A1* | 5/2013 | Wu | H01M 10/052 29/730 |
| 2019/0074143 A1* | 3/2019 | Naoi | H01M 4/139 |

FOREIGN PATENT DOCUMENTS

| | | |
|---|---|---|
| CN | 104124414 B | 6/2017 |
| CN | 108110308 A | 6/2018 |
| CN | 105789675 B | 10/2018 |
| CN | 110034337 A | 7/2019 |
| CN | 209843844 U | 12/2019 |
| CN | 210468000 U | 5/2020 |
| JP | 1994013129 U | 2/1994 |
| JP | 2006107847 A | 4/2006 |
| JP | 2008152946 A | 7/2008 |
| JP | 2010055962 A | 3/2010 |
| JP | 2013179035 A | 9/2013 |
| KR | 1020110092463 A | 8/2011 |
| KR | 1020130025958 A | 3/2013 |
| KR | 1020160149794 A | 12/2016 |
| KR | 1020170098630 A | 8/2017 |
| WO | 2012023422 A1 | 2/2012 |

OTHER PUBLICATIONS

The extended European search report for European Application No. 20874982.0, dated May 17, 2022, 7 pages.
PCT International Search Report for PCT/CN2020/114503, dated Dec. 10, 2020, 15 pages.
The First Office Action for Japanese Application No. 2022-521575, dated May 30, 2023, 13 pages.
The First Office Action for Korean Application No. 10-2022-7012141, dated Oct. 31, 2023, 23 pages.
The Notice of Allowance for Korean Application No. 10-2022-7012141, dated Feb. 19, 2024, 6 pages.

* cited by examiner

METHOD AND APPARATUS FOR MANUFACTURING ELECTRODE ASSEMBLY OF SECONDARY BATTERY

CROSS-REFERENCE OF RELATED APPLICATIONS

The present application is a continuation of International Application No. PCT/CN2020/114503, filed on Sep. 10, 2020, which claims priority to Chinese Patent Application No. 201910957293.5, filed on Oct. 10, 2019, both of which are hereby incorporated by reference in their entireties.

TECHNICAL FIELD

The present application relates to the field of battery technology, in particular to a method and apparatus for manufacturing an electrode assembly of a secondary battery.

BACKGROUND

With the development of society, human beings pay more and more attention to the importance of protecting the environment. Therefore, new energy vehicles are widely used as a transportation means with good environmental friendliness. The main source of power for new energy vehicles is power batteries. In the power battery processing equipment, the electrode assembly forming the power battery is wound by a winding machine, making the winding machine become an important apparatus for the production of power batteries. However, the currently equipped winding machine basically adopts a process in which the positive electrode plate, the separator, the negative electrode plate, and the separator are simultaneously wound around the winding needle and then cut. This type of winding machine is prone to problems such as the folding of the pole piece and the entraining of dust in winding during the production process, which in turn affects the yield and production efficiency of the electrode assembly. In addition, the current winding manner requires a roll-in auxiliary mechanism, such as a merging film roller group or a rolling feeding component, to be disposed in the upstream close to the winding needle to assist the positive electrode plate, the separator and the negative electrode plate to smoothly enter the winding needle separately, which causes the structure of the winding machine is complicated, and the efficiency of feeding and winding is low.

SUMMARY

Embodiments of the present application provide a method and apparatus for manufacturing an electrode assembly of a secondary battery. The method for manufacturing the electrode assembly of the secondary battery can improve the yield of the electrode assembly, simplify the structure of the winding apparatus, and improve the efficiency of the winding operation.

Embodiments of the present application proposes a method for manufacturing an electrode assembly of a secondary battery, which includes:
    joining a positive electrode plate and a first separator to form a positive electrode composite plate body;
    joining a negative electrode plate and a second separator to form a negative electrode composite plate body;
    winding the positive electrode composite plate body and the negative electrode composite plate body together to form an electrode assembly, and the positive electrode plate and the negative electrode plate are disposed to isolate from each other by a first separator and a second separator.

According to an embodiment of the present application, before completing the joining of the positive electrode plate and the first separator, a cutting off process is performed for the positive electrode plate in the upstream of the joining position of the positive electrode plate and the first separator; and/or
Before completing the joining of the negative electrode plate and the second separator, a cutting off process is performed for the negative electrode plate in the upstream of the joining position of the negative electrode plate and the second separator.

According to an embodiment of the present application, in the upstream of the joining position of the positive electrode plate and the first separator, a dust removal process is performed for the positive electrode plate and/or the first separator before joined; and/or
In the upstream of the joining position of the negative electrode plate and the second separator, a dust removal process is performed for the negative electrode plate and/or the second separator before joined.

According to an embodiment of the present application, in the step of joining the positive electrode plate and the first separator to form a positive electrode composite plate body, the composite starting end and/or the composite ending end of the positive electrode plate is adhesively connected to the first separator; and/or
In the step of joining the negative electrode plate and the second separator to a negative electrode composite plate body, the composite starting end and/or the composite ending end of the negative electrode plate is adhesively connected to the second separator.

According to an embodiment of the present application, in the step of winding the positive electrode composite plate body and the negative electrode composite plate body together to form an electrode assembly, the positive electrode composite plate body and/or the negative electrode composite plate body is transported from bottom to top to winding station and a winding process is performed.

According to an embodiment of the present application, the joining of the positive electrode plate and the first separator may be completed in composite manner such as electrostatic adsorption, hot pressing joining, or glue pasting joining; and/or the joining of the negative electrode plate and the second separator may be completed in a composite manner such as electrostatically adsorption, plasma adsorption, hot pressing joining or glue pasting joining.

According to an embodiment of the present application, before the winding process is performed, the positive electrode plate and the first separator are joined in advance, and the negative electrode plate and the second separator are joined, so that the positive electrode plate and the first separator are connected to each other to form a whole, and the negative electrode plate and the second separator are connected to each other to form a whole. Then, the positive electrode composite plate body and the negative electrode composite plate body are separately transported to the winding station. The positive electrode plate and the negative electrode plate are separately driven by the first separator and the second separator to enter the winding process. In this way, in contrast to the processing manner that the positive electrode plate, the negative electrode plate, and the separator enter the winding process independently, the method for manufacturing the electrode assembly of the secondary battery in the embodiments of the present application, on the one hand, can effectively reduce the total number of plate bodies entering the winding process. Therefore it is beneficial to reducing the difficulty of aligning the positive electrode plate, the negative electrode plate and the separator, reducing the possibility that the positive electrode plate and the negative electrode plate are not aligned with each other, and improving the winding alignment accuracy. Here, alignment means that the positive electrode plate, the negative electrode plate and the separator are aligned with each other in their respective width directions. On the other hand, it can reduce the possibility that the positive electrode plate and the negative electrode plate may be folded or wrinkled when entering the winding process, and effectively improve the yield of the electrode assembly; moreover, the positive electrode plate, the negative electrode plate and the separator may not be provided with a roll-in auxiliary mechanism, such as a merging film roller group or a rolling feeding component, for guiding the positive electrode plate and the negative electrode plate to be rolled in, in the upstream close to the winding station, which is beneficial to reducing the number of parts used, simplifying the overall structure of the corresponding winding apparatus, and at the same time improving the efficiency of the winding operation.

Embodiments of the present application further provide an apparatus for manufacturing an electrode assembly of a secondary battery, which includes:
- a positive electrode feeding device for outputting a positive electrode plate;
- a first separator feeding device for outputting a first separator;
- a first joining device arranged in the downstream of the positive electrode feeding device and the first separator feeding device, wherein the first joining device can join the positive electrode plate and the first separator to form a positive electrode composite plate body;
- a negative electrode feeding device for outputting a negative electrode plate;
- a second separator feeding device for outputting a second separator;
- a second joining device arranged in the downstream of the negative electrode feeding device and the second separator feeding device, wherein the second joining device can join the negative electrode plate and the second separator to form a negative electrode composite plate body;
- a winding device arranged in the downstream of the first joining device and the second joining device, wherein the winding device can wind the positive electrode composite plate body and the negative electrode composite plate body to form an electrode assembly.

According to an embodiment of the present application, the apparatus further includes a positive electrode plate cutter, the positive electrode plate cutter is arranged in the upstream of the first joining device, and the positive electrode plate cutter is configured for cutting off the positive electrode plate in the upstream the joining position of the positive electrode plate and the first separator; and/or The apparatus further includes a negative electrode plate cutter, the negative electrode plate cutter is arranged in the upstream of the second joining device, and the negative electrode plate cutter is configured for cutting off the negative electrode plate in the upstream of the joining position of the negative electrode plate and the second separator.

According to an embodiment of the present application, the apparatus further includes a first dust removal device, the first dust removal device is arranged in the upstream of the first joining device, and the first dust removal device is configured for performing dust removal process for the positive electrode plate and/or the first separator before joined; and/or The apparatus further includes a second dust removal device, the second dust removal device is arranged in the upstream of the second joining device, and the second dust removal device is configured for performing a dust removal process for the negative electrode plate and/or the second separator before joined.

According to an embodiment of the present application, the winding device includes a winding needle, a positive electrode roll-in guide roller group and a negative electrode roll-in guide roller group, and the positive electrode roll-in guide roller group and the negative electrode roll-in guide roller group are both arranged in the upstream of the winding needle, the positive electrode roll-in guide roller group and the negative winding roller group are disposed below the winding needle, the positive electrode roll-in guide roller group transports the positive electrode composite plate body directly to the winding needle from bottom to top, and the negative electrode roll-in guide roller group transports the negative composite plate body directly to the winding needle from bottom to top.

According to an embodiment of the present application, the winding device further includes a rotating base and two or more winding needles, and the two or more winding needles are arranged on the rotating base at intervals around a rotation axis of the rotating base.

According to an embodiment of the present application, the apparatus further includes a first glue pasting device, the first glue pasting device is arranged in the downstream of the first joining device, and the first glue pasting device is configured for adhesively connecting the composite starting end and/or the composite ending end of the positive electrode plate to the first separator; and/or The apparatus further includes a second glue pasting device, the second glue pasting device is arranged in the downstream of the second joining device, and the second glue pasting device is configured for adhesively connecting the composite starting end and/or composite ending end of the negative electrode plate to the second separator.

According to an embodiment of the present application, the apparatus further includes a first detection device, the first detection device is arranged in the downstream of the first joining device, and the first detection device is configured for detecting the composite alignment degree of the positive electrode plate and the first separator; and/or The apparatus further includes a second detection device, the second detection device is provided in the downstream of the second joining device, the second detection device is configured for detecting the composite alignment degree of the negative electrode plate and the second separator.

According to an embodiment of the present application, the apparatus further includes a first correcting device, the first correcting device is arranged in the upstream of the first joining device, the first correcting device is configured for adjusting the relative position of the positive electrode plate and the first separator; and/or The apparatus further includes a second correcting device, the second correcting device is arranged in the upstream of the second joining device, the second correcting device is configured for adjusting the relative position of the negative electrode plate and the second separator.

According to an embodiment of the present application, the apparatus further includes a tension adjusting device, the tension adjusting device is arranged in the upstream of the winding device, and is configured for adjusting the tension of the positive electrode composite plate body or the negative electrode composite plate body.

According to the equipment for manufacturing the electrode assembly of the secondary battery according to the embodiment of the present application, the positive electrode plate and the first separator are joined in advance by the first joining device, and the negative electrode plate and the second separator are joined in advance by the second joining device, so that the positive electrode plate and the first separator are connected to each other to form a whole, and the negative electrode plate and the second separator are connected to each other to form a whole. Then, the positive electrode composite plate body and the negative electrode composite plate body are separately transported to the winding station of the winding device to complete the winding operation. The positive electrode plate and the negative electrode plate are respectively driven by the first separator and the second separator to enter the winding process. In this way, in contrast to the processing manner that the positive electrode plate, the negative electrode plate, and the separator enter the winding process independently, the apparatus for manufacturing the electrode assembly of the secondary battery in the embodiment of the present application can effectively reduce the total number of plate bodies entering the winding process, which is beneficial to reducing the difficulty of aligning the positive electrode plate, the negative electrode plate and the separator, reducing the possibility that the positive electrode plate and the negative electrode plate are not aligned with each other, and improving the winding alignment accuracy. On the other hand, it can reduce the possibility that the positive electrode plate and the negative electrode plate may be folded or wrinkled when entering the winding process, which is beneficial to improving the yield of the electrode assembly; moreover, the positive electrode plate, the negative electrode plate and the separator may not be provided with a roll-in auxiliary mechanism for guiding the positive electrode plate and the negative electrode plate to be rolled in in the upstream close to the winding device, which is beneficial to reducing the number of parts used, simplifying the overall structure of the apparatus, and at the same time improving the efficiency of winding operation.

BRIEF DESCRIPTION OF THE DRAWINGS

In order to explain the technical solutions of embodiments of the present application more clearly, the drawings needed in the embodiments will be briefly introduced. Obviously, the drawings in the following description are only some embodiments of the present application. For the skilled person in the art, without inventive work, other drawings can be obtained from these drawings.

Figure 1:
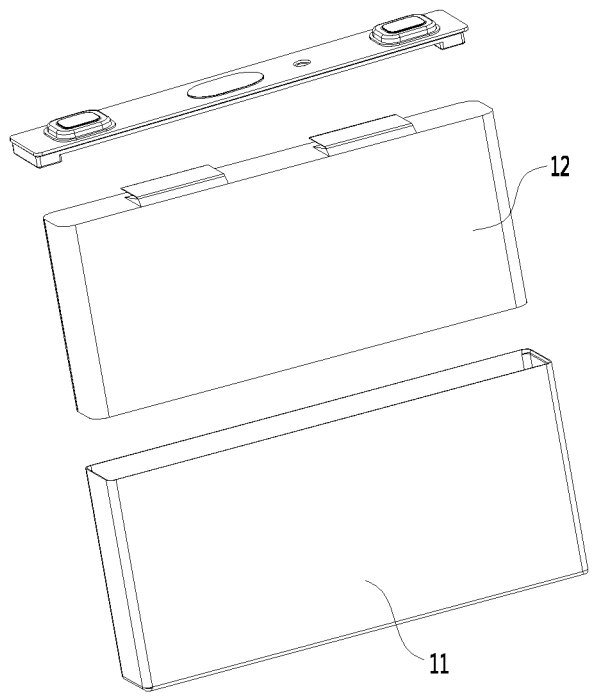
FIG. 1 is a schematic diagram of an exploded structure of a secondary battery according to an embodiment of the present application.

In the drawings, the drawings are not drawn according to actual scale.

REFERENCE DESCRIPTION

10. secondary battery; 11. case; 12. electrode assembly; 121. positive electrode plate; 122. first separator; 123. negative electrode plate; 124. second separator; 20. positive electrode composite plate body; 30. negative electrode composite plate body; 99. joining position; 100. apparatus; 101. positive electrode feeding device; 102. first separator feeding device; 103. first joining device; 104. negative electrode feeding device; 105. second separator feeding device; 106. second joining device; 107. winding device; 107*a*. winding needle; 107*b*, rotating base; 107*c*. positive electrode roll-in guide roller group; 107*d*. negative electrode roll-in guide roller group; 108. tension adjustment device; 109. positive electrode plate cutter; 110. negative electrode plate cutter; 111. first dust removal device; 112, second dust removal device; 113. separator cutter; 114. first glue pasting device; 115. second glue pasting device; 116. first detection device; 117. second detection device; 118. first correction device; 119. second correction device.

DETAILED DESCRIPTION

The following describes the implementation of the present application in further detail with reference to the accompanying drawings and examples. The detailed description and drawings of the following embodiments are used to exemplarily illustrate the principle of the present application, but in no way to limit the scope of the present application, that is, the present application is not limited to the described embodiments.

In the description of the present application, it should be noted that, unless otherwise specified, "plurality" means more than two; the orientation or positional relationship indicated by the terms "upper", "lower", "left", "right", "inner", "outside", etc. is only for the convenience of describing the present application and simplifying the description, and does not indicate or imply that the device or element referred to must have a specific orientation, and must be constructed and operated in a specific orientation, and therefore cannot be understood as a limitation to the present application. In addition, the terms "first", "second", "third", etc. are only used for descriptive purposes, and cannot be understood as indicating or implying relative importance. The term "vertical" does not require "vertical" strictly, but within the allowable error range. The term "parallel" does not require "parallel" strictly, but within the allowable error range.

The orientation words appearing in the following description are all directions shown in the figures, and do not limit the specific structure of the present application. In the description of the present application, it should also be noted that, unless otherwise clearly defined and limited, the terms "mounting", "to be connected with", and "connecting" should be understood in a broad sense and for example, may be a fixed connection or a detachable connection, or integral connection; may be directly connected or indirectly connected through an intermediate medium. For the skilled person in the art, the specific meaning of the above-mentioned terms in the present application can be understood according to specific circumstances.

In order to better understand the present application, the following describes embodiments of the present application in conjunction with FIGS. 1 to 4.

Referring to FIG. 1, embodiments of the present application provide a secondary battery 10. The secondary battery 10 includes a case 11, an electrode assembly 12 provided in the case 11, and a top cover assembly that is hermetically connected to the case 11. The case 11 in the embodiment of the present application has a square structure or other shapes. The case 11 has an internal space for accommodating the electrode assembly 12 and the electrolyte, and an opening communicating with the internal space. The case 11 may be made of materials such as aluminum, aluminum alloy, or plastic.

Figure 2:
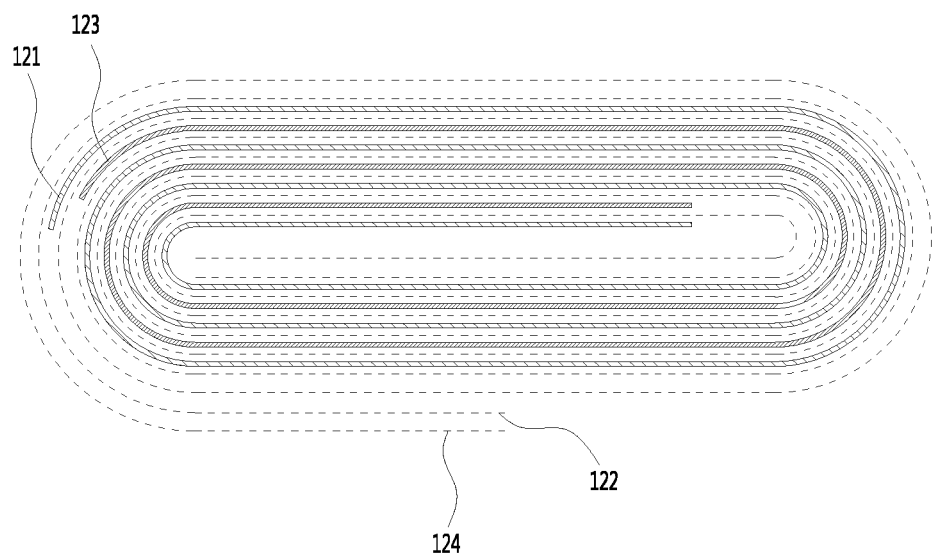
FIG. 2 is a schematic cross-sectional structure diagram of an electrode assembly according to an embodiment of the present application.

As shown in FIG. 2, the electrode assembly 12 of the embodiment of the present application includes a positive electrode plate 121, a negative electrode plate 123 and a separator, wherein the separator is an insulator between the positive electrode plate 121 and the negative electrode plate 123. The electrode assembly 12 has a main body and tabs. The main body of the present embodiment has a flat structure as a whole, which has a predetermined thickness, height, and width. The active material of the positive electrode plate 121 is coated on the coated area of the positive electrode plate 121, and the active material of the negative electrode plate 123 is coated on the coated area of the negative electrode plate 123. The uncoated area extending from the coated area of the main body is used as a tab. The electrode assembly 12 includes two tabs, namely a positive electrode tab and a negative electrode tab. The positive electrode tab extends from the coated area of the positive electrode plate 121, and the negative electrode tab extends from the coated area of the negative electrode plate 123.

Figure 3:
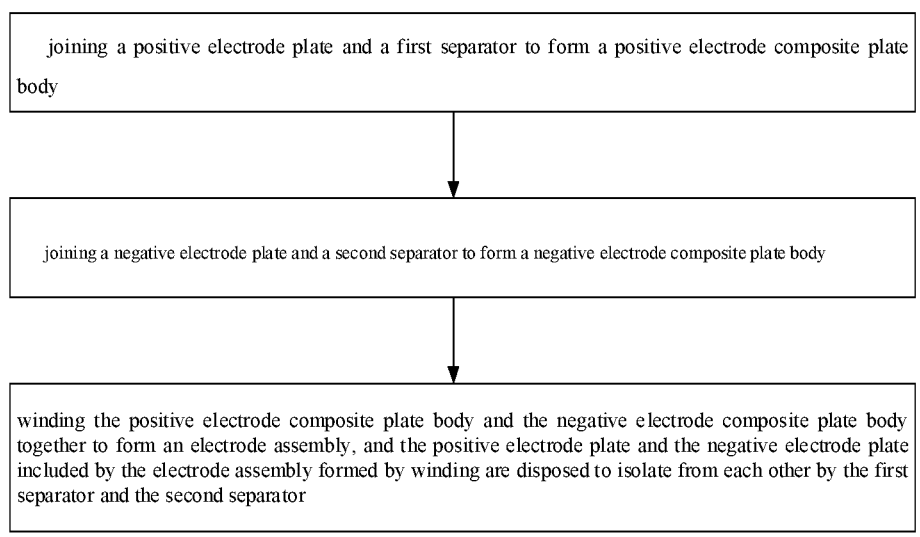
FIG. 3 is a flowchart of manufacturing an electrode assembly of a secondary battery according to an embodiment of the present application.

Referring to FIG. 3, embodiments of the present application provide a method for manufacturing an electrode assembly 12 of a secondary battery 10, which includes the following steps:

the positive electrode plate 121 and the first separator 122 are joined to form a positive electrode composite plate body 20;

the negative electrode plate 123 and the second separator 124 are joined to form a negative electrode composite plate body 30;

the positive electrode composite plate body 20 and the negative electrode composite plate body 30 are wound together to form the electrode assembly 12. The positive electrode plate 121 and the negative electrode plate 123 included by the wound electrode assembly 12 are disposed to isolate from each other through the first separator 122 and the second separator 124.

In an embodiment, the positive electrode plate 121 and the first separator 122 may complete the joining in a composite manner such as electrostatic adsorption, hot pressing joining or glue pasting joining. The positive electrode plate 121 and the first separator 122 are laminated on each other along the thickness direction of the positive electrode plate 121. The negative electrode plate 123 and the second separator 124 can complete the joining in a composite manner such as electrostatic adsorption, plasma adsorption, hot pressing joining or glue pasting joining. The negative electrode plate 123 and the second separator 124 are laminated on each other in the thickness direction of the negative electrode plate 123.

In the embodiment of the present application, before the winding process is performed, the positive electrode plate 121 and the first separator 122 are joined in advance, and the negative electrode plate 123 and the second separator 124 are joined, so that the positive electrode plate 121 and the first separator 122 are connected to each other to form a whole, and the negative electrode plate 123 and the second separator 124 are connected to each other to form a whole. Then, the positive electrode composite plate body 20 and the negative electrode composite plate body 30 are separately transported to the winding station. The positive electrode plate 121 and the negative electrode plate 123 are respectively driven by the first separator 122 and the second separator 124 to enter the winding process. In this way, in contrast to the processing manner that the positive electrode plate 121, the negative electrode plate 123, and the separator enter the winding process independently, the method for manufacturing the electrode assembly 12 of the secondary battery 10 according to the embodiment of the present application, on the one hand, can effectively reduce the total number of plate body entering into the winding process. Thus it is beneficial to reducing the difficulty in alignment of the positive electrode plate 121, the negative electrode plate 123 and the separator, reducing the possibility of the positive electrode plate 121 and the negative electrode plate 123 being misaligned with each other, and improving the winding alignment accuracy. Here, alignment means that the positive electrode plate 121, the negative electrode plate 123, and the separator are aligned with each other in their respective width directions. On the other hand, it can reduce the possibility of that the positive electrode plate 121 and the negative electrode plate 123 may be folded or wrinkled when entering into the winding process, which effective improves the yield of the electrode assembly 12; moreover, the positive electrode plate 121, the negative electrode plate 123 and the separator may not be provided with a roll-in auxiliary mechanism, such as a merging film roller group or a rolling feeding component, for guiding the positive electrode plate 121 and the negative electrode plate 123 to be rolled in in the upstream close to the winding station, which is beneficial to reducing the number of parts used, simplifying the overall structure of the corresponding winding apparatus, and at the same time improving the efficiency of winding operation.

In an embodiment, before the joining between the positive electrode plate 121 and the first separator 122 is completed, a cutting off process is performed for the positive electrode plate 121 in the upstream of the joining position of the positive electrode plate 121 and the first separator 122. The joining position 99 of the positive electrode plate 121 and the first separator 122 is far away from the winding station. Therefore, the cutting off process is performed for the positive electrode plate 121 in the upstream of the joining position 99, which can further effectively reduce the possibility of a short circuit between the positive electrode plate 121 and the negative electrode plate 123 caused by the dust piercing the separator due to the dust generated during the cutting off process to be rolled in. After the cutting off process is performed for the positive electrode plate 121, the positive electrode plate 121 forms a composite ending end close to the joining position 99 and a composite starting end far away from the joining position 99 and for winding the next electrode assembly 12 on two sides of the cutting off position, respectively. In an exemplary embodiment, the cutting off process may be performed by a mechanical cutter or a laser cutter.

In an embodiment, before the joining of the negative electrode plate 123 and the second separator 124 is completed, a cutting off process is performed for the negative electrode plate 123 in the upstream of the joining position 99 of the negative electrode plate 123 and the second separator 124. The joining position 99 of the negative electrode plate 123 and the second separator 124 is far away from the winding station. Therefore, the cutting off process is performed for the negative electrode plate 123 in the upstream of the joining position 99, which can further effectively reduce the possibility of a short circuit between the positive electrode plate 121 and the negative electrode plate 123 caused by the dust piercing the separator due to the dust generated during the cutting off process to be rolled in. After the cutting off process is performed for the negative electrode plate 123, the negative electrode plate 123 forms a composite ending end close to the joining position 99 and a composite starting end far away from the joining position 99 and for winding the next electrode assembly 12 on two sides of the cutting off place, respectively. In an exemplary embodiment, the cutting off process may be performed by a mechanical cutter or a laser cutter.

In an exemplary embodiment, before the joining of the positive electrode plate 121 and the first separator 122 is completed, a cutting off process is performed for the positive electrode plate 121 in the upstream of the joining position 99 of the positive electrode plate 121 and the first separator 122, and at the same time before the joining of the negative electrode plate 123 and the second separator 124 is completed, a cutting off process is performed for the negative electrode plate 123 in the upstream of the joining position 99 of the negative electrode plate 123 and the second separator 124.

In an embodiment, in the upstream of the joining position 99 of the positive electrode plate 121 and the first separator 122, a dust removal process is performed for the positive electrode plate 121 before joined, so as to remove dust generated during the cutting off process of the positive electrode plate 121 or remove the dust that enters the area of the positive electrode plate 121 close to the joining position 99 from the external environment, and reduce the possibility that the dust will follow the positive electrode plate 121, remain in the positive electrode composite plate body 20 formed after the joining is completed and follow the positive electrode composite plate body 20 to be rolled in. In another embodiment, in the upstream of the joining position 99 of the positive electrode plate 121 and the first separator 122, the dust removal process is performed for the first separator 122 before joined to remove the dust that enters the area of the first separator 122 close to the joining position 99 from the external environment and reduce the possibility that the dust will follow the first separator 122, remain in the positive electrode composite plate body 20 formed after the joining is completed and follow the positive electrode composite plate body 20 to be rolled in. In an exemplary embodiment, in the upstream of the joining position 99 of the positive electrode plate 121 and the first separator 122, a dust removal process is simultaneously performed for the positive electrode plate 121 and the first separator 122 before joined.

In an embodiment, in the upstream of the joining position 99 of the negative electrode plate 123 and the second separator 124, a dust removal process is performed for the negative electrode plate 123 before joined, so as to remove dust generated during the cutting off process of the negative electrode plate 123 or remove the dust that enters the area of the negative electrode plate 123 close to the joining position 99 from the external environment, and reduce the possibility that the dust will follow the negative electrode plate 123, remain in the negative electrode composite plate body 30 formed after the joining is completed and follow the negative electrode composite plate body 30 to be rolled in. In another embodiment, in the upstream of the joining position 99 of the negative electrode plate 123 and the second separator 124, a dust removal process is performed for the second separator 124 before joined to remove the dust that enters the area of the second separator 124 close to the joining position 99 from the external environment, and reduce the possibility that the dust will follow the second separator 124, remain in the negative electrode composite plate body 30 formed after the joining is completed and follow the negative electrode composite plate body 30 to be rolled in. In an exemplary embodiment, in the upstream of the joining position 99 of the negative electrode plate 123 and the second separator 124, the dust removal process is simultaneously performed for the negative electrode plate 123 and the second separator 124 before joined.

The positive electrode plate 121 to be joined has a composite starting end. After the positive electrode plate 121 is cut off after one winding process is completed, a composite ending end and a composite starting end for the next winding process are formed. In the step that the positive electrode plate 121 and the first separator 122 are joined to form the positive electrode composite plate body 20: the composite starting end or the composite ending end of the positive electrode plate 121 is adhesively connected to the first separator 122, thereby effectively reducing the possibility that during the composite process, the conveying process or the winding process, the composite starting end or the composite ending end of the positive electrode plate 121 joined to the first separator 122 may be folded or wrinkled. In an example, the composite starting end or composite ending end of the positive electrode plate 121 is adhesively connected to the first separator 122 by an adhesive tape. In an exemplary embodiment, the composite starting end and the composite ending end of the positive electrode plate 121 are adhesively connected to the first separator 122.

The negative electrode plate 123 to be joined has a composite starting end. After the negative electrode plate 123 is cut off after one winding process is completed, a composite ending end and a composite starting end for the next winding process are formed. In the step that the negative electrode plate 123 and the second separator 124 are joined to form the negative electrode composite plate body 30: the composite starting end or the composite ending end of the negative electrode plate 123 is adhesively connected to the second separator 124, thereby effectively reducing the possibility that during the composite process, the conveying process or the winding process, the composite starting end or the composite ending end of the negative electrode plate 123 joined to the second separator 124 may be folded or wrinkled. In an example, the composite starting end or composite ending end of the negative electrode plate 123 is adhesively connected to the second separator 124 by an adhesive tape. In an exemplary embodiment, the composite starting end and the composite ending end of the negative electrode plate 123 are adhesively connected to the second separator 124.

In the step of winding the positive electrode composite plate body 20 and the negative electrode composite plate body 30 together to form the electrode assembly 12, the positive electrode composite plate body 20 or the negative electrode composite plate body 30 is transported from bottom to top to the winding station and the winding process is performed. Here, "from bottom to top" refers to the vertical direction as the reference direction. Since the positive electrode plate 121 and the negative electrode plate 123 of the embodiment of the present application are joined with the first separator 122 and the second separator 124 respectively, the positive electrode plate 121 and the negative electrode plate 123 follow the first separator 122 and the second separator 124 respectively to go through the winding process directly. Therefore, the positive electrode composite plate body 20 or the negative electrode composite plate body 30 of the embodiment of the present application can adopt the manner of conveying from bottom to top, and meanwhile the composite starting end and the composite ending end of the positive electrode plate 121 or the negative electrode plate 123 will not be put in a hanging down state under its own gravity, which otherwise results in fold or wrinkle. In addition, it can further make that during the conveying process of the positive electrode composite plate body 20 or the negative electrode composite plate body 30, the dust carried will be separated and fall under the action of its own gravity, thereby reducing the possibility that the dust will follow the positive electrode composite plate body 20 or the negative electrode composite plate body 30 to enter into the electrode assembly 12 resulting from winding and affect the use safety of the electrode assembly 12. In an exemplary embodiment, the positive electrode composite plate body 20 and the negative electrode composite plate body 30 are conveyed from bottom to top to the winding station and the winding process is performed.

The method for manufacturing the electrode assembly 12 of the secondary battery 10 in the embodiment of the present application adopts the manner that the positive electrode plate 121 and the first separator 122 are joined and the negative electrode plate 123 and the second separator 124 are joined in advance, and then the composite plate body 20 and the negative electrode composite plate body 30 are wound. Therefore, compared with the manner that the positive electrode plate 121, the negative electrode plate 123, and the two separators are wound independently, the method in the embodiment of the present application is no longer necessary to provide a roll-in auxiliary mechanism for guiding the positive electrode plate 121, the negative electrode plate 123 and the two separators to be rolled in, thereby reducing the number of parts used, at the same time more easily ensuring the accuracy of alignment of the positive electrode plate 121, the negative electrode plate 123, the first separator 122 and the second separator 124, and reducing the possibility of affecting the electrical performance of the electrode assembly 12 due to misalignment of the positive electrode plate 121, the negative electrode plate 123, and the separator.

Figure 4:
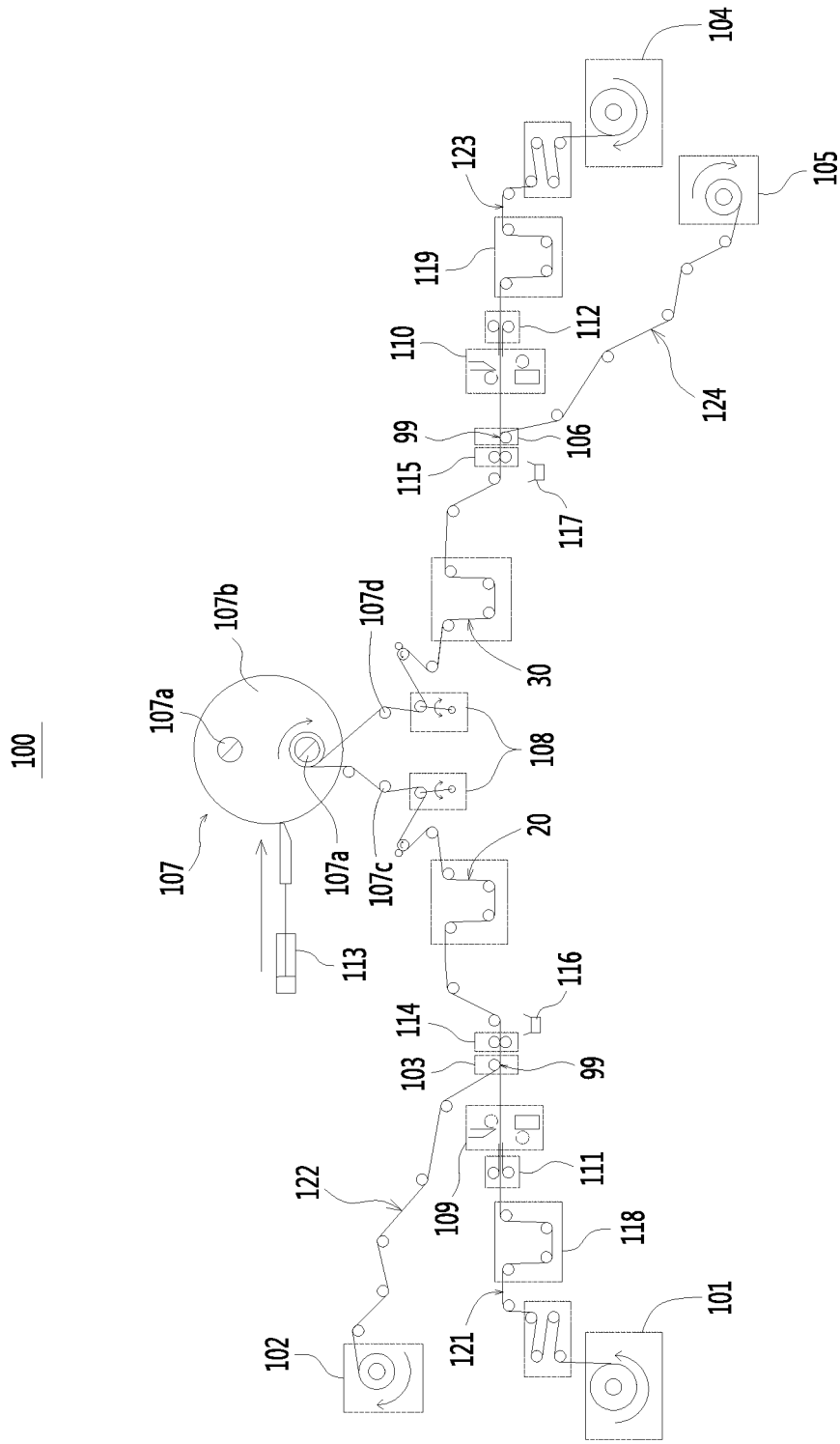
FIG. 4 is a schematic structural diagram of an apparatus for manufacturing an electrode assembly of a secondary battery according to an embodiment of the present application.

Referring to FIG. 4, embodiments of the present application provide an apparatus 100 for manufacturing the electrode assembly 12 of the secondary battery 10, which can be used to implement the method for manufacturing the electrode assembly 12 of the secondary battery 10 in the foregoing embodiments. The apparatus 100 of the present embodiment includes a positive electrode feeding device 101, a first separator feeding device 102, a first joining device 103, a negative electrode feeding device 104, a second separator feeding device 105, a second joining device 106, and a winding device 107.

The positive electrode feeding device 101 is used to mount and fix the positive electrode plate 121 material roll, and then output the positive electrode plate 121 through the unwinding machine. The positive electrode plate 121 is driven by the transfer roller group to move toward the joining position 99. The first separator feeding device 102 is used to mount and fix the separator material roll, and then output the first separator 122 through the unwinding machine. The first separator 122 moves toward the joining position 99 under the driving of the conveying roller group. The first joining device 103 is arranged in the downstream of the positive electrode feeding device 101 and the first separator feeding device 102. Both the positive electrode plate 121 and the first separator 122 are transported to the first joining device 103, and then the first joining device 103 joins the positive electrode plate 121 and the first separator 122 to form the positive electrode composite plate body 20. In an example, the first joining device 103 includes a hot pressing mechanism. The positive electrode plate 121 and the first separator 122 are joined through hot pressing by a hot pressing mechanism. In another example, the first joining device 103 includes an electrostatic generator. The positive electrode plate 121 and the first separator 122 are joined through electrostatic adsorption. In yet another example, the first joining device 103 includes a glue pasting mechanism. The positive electrode plate 121 and the first separator 122 are joined via pasting glue. The positive electrode plate 121 and the first separator 122 are laminated and joined on each other in the thickness direction.

The negative electrode feeding device 104 is used to mount and fix the negative electrode plate 123 material roll, and then output the negative electrode plate 123 through the unwinding machine. The negative electrode plate 123 moves toward the joining position 99 under the driving of the transfer roller group. The second separator feeding device 105 is used to mount and fix the separator material roll, and then output the second separator 124 through the unwinding machine. The second separator 124 moves toward the joining position 99 under the driving of the conveying roller group. The second joining device 106 is arranged downstream of the negative electrode feeding device 104 and the second separator feeding device 105. Both the negative electrode plate 123 and the second separator 124 are transported to the second joining device 106, and then the second joining device 106 joins the negative electrode plate 123 and the second separator 124 to form a negative composite plate body 30. In an example, the second joining device 106 includes a hot pressing mechanism. The negative electrode plate 123 and the second separator 124 are joined through hot pressing by a hot pressing mechanism. In another example, the second joining device 106 includes an electrostatic generator. The negative electrode plate 123 and the second separator 124 are joined through electrostatic adsorption. In yet another example, the second joining device 106 includes a glue pasting mechanism. The negative electrode plate 123 and the second separator 124 are joined via pasting glue. The negative electrode plate 123 and the second separator 124 are superimposed and joined on each other in the thickness direction.

The winding device 107 is provided in the downstream of the first joining device 103 and the second joining device 106. The positive electrode composite plate body 20 and the negative electrode composite plate body 30 are conveyed to the winding device 107. The winding device 107 winds the positive electrode composite plate body 20 and the negative electrode composite plate body 30 to produce the electrode assembly 12.

In an embodiment, the first joining device 103 and the second joining device 106 are symmetrically arranged on both sides of the winding device 107, so as to ensure the consistency of the positions of the respective joining position 99 of the positive electrode plate 121 and the negative electrode plate 123 and the consistency of the roll-in positions of the positive electrode composite plate body 20 and the negative electrode composite plate body 30 formed after joined, which is beneficial to improving the alignment accuracy of the wound positive electrode plate 121 and the negative electrode plate 123.

In an embodiment, the apparatus 100 further includes a tension adjustment device 108. The tension adjusting device 108 is arranged in the upstream of the winding device 107 and is used to adjust the tension degree of the positive electrode composite plate body 20 or the negative electrode composite plate body 30.

In the apparatus 100 for manufacturing the electrode assembly 12 of the secondary battery 10 in the embodiment of the present application, the positive electrode plate 121 and the first separator 122 are joined in advance by the first joining device 103, and the negative electrode plate 123 and the second separator 122 are joined in advance by the second joining device 106, so that the positive electrode plate 121 and the first separator 122 are connected to each other to form a whole, and the negative electrode plate 123 and the second separator 124 are connected to each other to form a whole. Then, the positive electrode composite plate body 20 and the negative electrode composite plate body 30 are separately conveyed to the winding station of the winding device 107 to complete the winding operation. The positive electrode plate 121 and the negative electrode plate 123 are respectively driven by the first separator 122 and the second separator 124 to enter the winding process. In this way, in contrast to the processing manner that the positive electrode plate 121, the negative electrode plate 123, and the separator enter the winding process independently, the apparatus 100 for manufacturing the electrode assembly 12 of the secondary battery 10 of the embodiment of the present application, on the one hand, can effectively reduce the total number of the plate bodies entering into the winding process, which is beneficial to reducing the difficulty in alignment of the positive electrode plate 121, the negative electrode plate 123 and the separator, reducing the possibility of misalignment of the positive electrode plate 121 and the negative electrode plate 123, and improving the accuracy of winding alignment. On the other hand, it can reduce the possibility that the positive electrode plate and the negative electrode plate 123 may be folded or wrinkled when entering the winding process, which is beneficial to improving the yield of the electrode assembly 12; moreover, the positive electrode plate 121, the negative electrode plate 123 and the separator may not be provided with a roll-in auxiliary mechanism for guiding the positive electrode plate 121 and the negative electrode plate 123 to be rolled in in the upstream close to the winding device 107, which is beneficial to reducing the number of parts used, simplifying the overall structure of the apparatus 100, and improving the efficiency of winding operation at the same time.

In an embodiment, the apparatus 100 further includes a positive electrode plate cutter 109 for cutting off the positive electrode plate 121. The positive electrode plate cutter 109 is arranged in the upstream of the first joining device 103. The positive electrode plate cutter 109 is used to cut off the positive electrode plate 121 in the upstream of the joining position 99 of the positive electrode plate 121 and the first separator 122. In an example, the positive electrode plate cutter 109 includes a cutter and a cutter seat. The positive electrode plate 121 passes between the cutter and the cutter holder. When it is necessary to cut off the positive electrode plate 121, the cutter and the cuter seat come close to each other to cut off the positive electrode plate 121. In an example, the positive electrode plate cutter 109 may be a laser cutter, and the positive electrode plate 121 is cut by laser. Before the joining of the positive electrode plate 121 and the first separator 122 is completed, a cutting off process is performed for the positive electrode plate 121 in the upstream of the joining position 99 of the positive electrode plate 121 and the first separator 122. The joining position 99 between the positive electrode plate 121 and the first separator 122 is far away from the winding station. Therefore, the cutting off process is performed for the positive electrode plate 121 in the upstream of the joining position 99, which can further effectively reduce the possibility of a short circuit between the positive electrode plate 121 and the negative electrode plate 123 caused by the dust piercing the separator due to the dust generated during the cutting off process to be rolled in. In an embodiment, the apparatus 100 further includes a negative electrode plate cutter 110 for cutting the negative electrode plate 123. The negative electrode plate cutter 110 is arranged in the upstream of the second joining device 106. The negative electrode plate cutter 110 is used to cut off the negative electrode plate 123 in the upstream of the joining position 99 of the negative electrode plate 123 and the second separator 124. In an example, the negative electrode plate cutter 110 includes a cutter and a cutter seat. The negative electrode plate 123 passes between the cutter and the cutter seat. When it is necessary to cut off the negative electrode plate 123, the cutter and the cutter seat come close to each other to cut off the negative electrode plate 123. In an example, the negative electrode plate cutter 110 may be a laser cutter, and the negative electrode plate 123 is cut by laser. Before the joining of the negative electrode plate 123 and the second separator 124 is completed, a cutting off process is performed for the negative electrode plate 123 in the upstream of the joining position 99 of the negative electrode plate 123 and the second separator 124. The joining position 99 of the negative electrode plate 123 and the second separator 124 is far away from the winding station. Therefore, the cutting off process is performed for the negative electrode plate 123 in the upstream of the joining position 99, which can further effectively reduce the possibility of a short circuit between the positive electrode plate 121 and the negative electrode plate 123 caused by the dust piercing the separator due to the dust generated during the cutting off process to be rolled in. In an exemplary embodiment, the apparatus 100 includes a positive electrode plate cutter 109 for cutting off the positive electrode plate 121 and a negative electrode plate cutter 110 for cutting off the negative electrode plate 123.

In an embodiment, the apparatus 100 further includes a first dust removal device 111. The first dust removal device 111 is arranged in the upstream of the first joining device 103 and is used to perform a dust removal process for the positive electrode plate 121 and/or the first separator 122 before joined. The first dust removal device 111 is close to the positive electrode plate cutter 109. In the upstream of the joining position 99 of the positive electrode plate 121 and the first separator 122, the first dust removal device 111 performs a dust removal process for the positive electrode plate 121 and/or the first separator 122 before joined, so as to remove the dust generated during the cutting off process of the positive electrode plate 121 or remove the dust entering the area near the joining position 99 from the external environment, thus reducing the possibility that the dust will remain in the positive composite plate body 20 formed after the joining is completed and follow the positive composite plate body 20 to be rolled in. In an example, the first dust removal device 111 includes a dust suction tube and a negative pressure generator connected to the dust suction tube. In an embodiment, the apparatus 100 further includes a second dust removal device 112. The second dust removal device 112 is arranged in the upstream of the second joining device 106 and is used to perform a dust removal process for the negative electrode plate 123 and/or the second separator 124 before joined. The second dust removal device 112 is close to the negative electrode plate cutter 110. In the upstream of the joining position 99 of the negative electrode plate 123 and the second separator 124, the second dust removal device 112 performs a dust removal process for the negative electrode plate 123 and/or the second separator 124 before joined, so as to remove the dust generated during the cutting off process of the negative electrode plate 123 or remove the dust entering the area near the joining position 99 from the external environment, thus reducing the possibility that the dust will remain in the negative electrode composite plate body 30 formed after the joining is completed and follow the negative composite plate body 30 to be rolled in. In an example, the second dust removal device 112 includes a dust suction tube and a negative pressure generator connected to the dust suction tube.

In an embodiment, the winding device 107 includes a winding needle 107a, a positive electrode roll-in guide roller group 107c, and a negative electrode roll-in guide roller group 107d. Both the positive electrode roll-in guide roller group 107c and the negative electrode roll-in guide roller group 107d are arranged in the upstream of the winding needle 107a. In an example, both the positive electrode roll-in guide roller group 107c and the negative electrode roll-in guide roller group 107d are arranged below the winding needle 107a. The positive electrode roll-in guide roller group 107c directly conveys the positive electrode composite plate body 20 from bottom to top to the winding needle 107a. The negative electrode roll-in guide roller group 107d directly conveys the negative electrode composite plate body 30 from bottom to top to the winding needle 107a. In an example, the winding needle 107a includes two half shafts that can be close to or away from each other. The starting ends of the first separator 122 and the second separator 124 are pre-clamped between the two half shafts, and then the winding needle 107a is rotated by a predetermined number of turns to wind the first separator 122 and the second separator 124 with a predetermined length. Then, the positive electrode plate 121 and the negative electrode plate 123 are respectively driven by the first separator 122 and the second separator 124 to enter into the winding needle 107a for winding. After a predetermined length of the positive electrode plate 121 and the negative electrode plate 123 are wound, the positive electrode plate 121 and the negative electrode plate 123 are cut off. After the positive electrode plate 121 and the negative electrode plate 123 are wound, the winding needle 107a continues to rotate by a predetermined number of turns to continue winding the first separator 122 and the second separator 124. After the first separator 122 and the second separator 124 of a predetermined length are wound, the first separator 122 and the second separator 124 are cut off, and the winding operation is finally completed. The two half shafts are opened, and the electrode assembly 12 is removed from the winding needle 107a to complete the feeding. In an example, the winding device 107 includes a rotating base 107b and two winding needles 107a arranged on the rotating base 107b at intervals. After the first winding needle 107a completes the winding operation, the rotating base 107b rotates, so that the first winding needle 107a rotates to the feeding station, and the second winding needle 107a rotates to the winding station. The second coiling needle 107a clamps the first separator 122 and the second separator 124, and then the first separator 122 and the second separator 124 are cut off between the two winding needles 107a by the separator cutter 113. The two winding needles 107a are used in cycle to perform winding operation, so that in the process of winding a plurality of electrode assemblies 12 using the apparatus 100 for manufacturing the electrode assembly 12 of the secondary battery 10, the roll-in operation is required to perform on the first separator 122 and the second separator 124 only once in the initial stage, and then the two winding needles 107a alternately clamp the first separator 122 and the second separator 124 to continuously perform the winding operation. The roll-in operation is no longer required to perform on the first separator 122 and the second separator 124, thereby effectively improving the efficiency of the winding operation. The number of winding needles 107a is not limited to the above-mentioned two, and may be three or more. Each winding needle 107a can be switched between the unloading station and the winding station under the driving of the rotating base 107b. In an example, the positive electrode roll-in guide roller group 107c and the negative electrode roll-in guide roller group 107d are symmetrically arranged on both sides of the winding needle 107a in the winding station, so as to ensure the consistency of the roll-in positions of the positive electrode composite plate body 20 and the negative electrode composite plate body 30, which is beneficial to improving the alignment accuracy of the positive electrode plate 121 and the negative electrode plate 123 after the winding.

In an embodiment, the apparatus 100 includes a first glue pasting device 114. The first glue pasting device 114 is arranged in the downstream of the first joining device 103. The composite starting end or the composite ending end of the positive electrode plate 121 is adhesively connected to the first separator 122 through the first glue pasting device 114, thereby further effectively reducing the possibility that the composite starting end or the composite ending end of the positive electrode plate 121 joined to the first separator 122 may be folded or wrinkled during the composite process, conveying process or winding process. In an exemplary embodiment, the composite starting end and the composite ending end of the positive electrode plate 121 are adhesively connected to the first separator 122. In an example, the first glue pasting device 114 includes an adhesive tape output mechanism, an adhesive tape sticking mechanism, and an adhesive tape cutting-off mechanism. At least one of the composite starting end and the composite ending end of the positive electrode plate 121 is adhesively connected to the first separator 122 by an adhesive tape. In an embodiment, the apparatus 100 includes a second glue pasting device 115. The second glue pasting device 115 is arranged in the downstream of the second joining device 106. The composite starting end or the composite ending end of the negative electrode plate 123 is adhesively connected to the second separator 124 by the second glue pasting device 115, thereby further effectively reducing the possibility that the composite starting end or the composite ending end of the negative electrode plate 123 joined to the second separator 124 may be folded or wrinkled during the composite process, conveying process or winding process. In an exemplary embodiment, the composite starting end and the composite ending end of the negative electrode plate 123 are adhesively connected to the second separator 124. In an example, the second glue pasting device 115 includes an adhesive tape output mechanism, an adhesive tape sticking mechanism, and an adhesive tape cutting-off mechanism. The composite starting end or composite ending end of the negative electrode plate 123 is adhesively connected to the second separator 124 by an adhesive tape. In an exemplary embodiment, the apparatus 100 includes a first glue pasting device 114 and a second glue pasting device 115.

In an embodiment, the apparatus 100 further includes a first detection device 116 for detecting the composite alignment degree of the positive electrode plate 121 and the first separator 122. The first detection device 116 is arranged in the downstream of the first joining device 103 and can detect in real time the alignment degree of the positive electrode plate 121 and the first separator 122 after being joined. When the alignment degree of the positive electrode plate 121 and the first separator 122 meets the accuracy requirements, the positive electrode composite plate body 20 can be transported to the winding device 107 for winding, which is beneficial to ensuring the yield and quality of the wound electrode assembly 12. In an example, the first detection device 116 includes an industrial camera or a photoelectric sensor for detecting the degree of alignment. In an embodiment, the apparatus 100 further includes a second detection device 117 for detecting the composite alignment degree of the negative electrode plate 123 and the second separator 124. The second detection device 117 is disposed in the downstream of the second joining device 106, and can detect in real time the alignment degree of the negative electrode plate 123 and the second separator 124 after being joined. When the alignment degree of the negative electrode plate 123 and the second separator 124 meets the accuracy requirements, the negative electrode composite plate body 30 can be transported to the winding device 107 for winding, which is beneficial to ensuring the yield and quality of the wound electrode assembly 12. In an example, the second detection device 117 includes an industrial camera or a photoelectric sensor for detecting the degree of alignment. In an exemplary embodiment, the apparatus 100 further includes a first detection device 116 and a second detection device 117.

In an embodiment, the apparatus 100 further includes a first correction device 118 for adjusting the alignment degree of the positive electrode plate 121 and the first separator 122. Before the positive electrode plate 121 and the first separator 122 are joined, the first correcting device 118 adjusts the relative position of the positive electrode plate 121 and the first separator 122 along the width direction of the positive electrode plate 121, so that the positive electrode plate 121 and the first separator 122 are aligned with each other so as to satisfy product requirements, which is beneficial to improving the yield of the wound electrode assembly 12. In an example, the apparatus 100 includes a first detection device 116. The first correction device 118 is in communication with the first detection device 116. When the first detection device 116 detects that the alignment degree between the positive electrode plate 121 and the first separator 122 does not meet the requirements, it sends a signal to the first correction device 118, and then the first correction device 118 performs a correction action to adjust the alignment degree of the positive electrode plate 121 and the first separator 122. In an embodiment, the apparatus 100 further includes a second correction device 119 for adjusting the alignment degree of the negative electrode plate 123 and the second separator 124. Before the negative electrode plate 123 and the second separator 124 are joined, the second correcting device 119 adjusts the relative position of the negative electrode plate 123 and the second separator 124 along the width direction of the negative electrode plate 123, so that the negative electrode plate 123 and the second separator 124 are aligned with each other so as to satisfy the product requirements, which is beneficial to improving the yield of the wound electrode assembly 12. In an example, the apparatus 100 includes a second detection device 117. The second correction device 119 is in communication with the second detection device 117. When the second detection device 117 detects that the alignment degree between the negative electrode plate 123 and the second separator 124 does not meet the requirements, it sends a signal to the second correcting device 119, and then the second correcting device 119 performs a correcting action to adjust the alignment degree of the negative electrode plate 123 and the second separator 124. In an exemplary embodiment, the apparatus 100 further includes a first correction device 118 and a second correction device 119.

According to the apparatus 100 for manufacturing the electrode assembly 12 of the secondary battery 10 of the embodiment of the present application, the positive electrode plate 121 and the first separator 122, and the negative electrode plate 123 and the second separator 124 are joined to form the positive electrode composite plate body 20 and the negative electrode composite plate body 30 in advance, so that the positive electrode plate 121 and the first separator 122 are connected as a whole, the negative electrode plate 123 and the second separator 124 are connected as a whole, and then the positive electrode composite plate body 20 and the negative electrode composite plate body 30 are wound to form the electrode assembly 12. In this way, on the one hand, the apparatus 100 of the embodiment of the present application does not require that the positive electrode plate 121, the negative electrode plate 123 and the separator to be rolled in for winding separately, which can reduce the possibility that the positive electrode plate 121 and the negative electrode plate 123 may be folded or wrinkled when they enter the winding process separately, and that the positive electrode plate 121 and the negative electrode plate 123 are not aligned with each other, and thus improve the yield of the electrode assembly 12 effectively. On the other hand, the positive electrode plate 121, the negative electrode plate 123 and the separator may not be provided with a roll-in auxiliary mechanism for guiding the positive electrode plate 121 and the negative electrode plate 123 to be rolled in in the upstream of the winding device 107, which is beneficial to reducing the number of parts used, simplifying the overall structure of the apparatus 100, and at the same time improving the efficiency of winding operation.

Although the present application has been described with reference to the preferred embodiments, without departing from the scope of the present application, various improvements can be made to it and the components therein can be replaced with equivalents. In particular, as long as there is no structural conflict, the various technical features mentioned in the various embodiments can be combined in any manner. The present application is not limited to the specific embodiments disclosed in the text, but includes all technical solutions falling within the scope of the claims.

What is claimed is:

1. An apparatus for manufacturing an electrode assembly of a secondary battery comprising:
   a positive electrode feeding device for outputting a positive electrode plate;
   a first separator feeding device for outputting a first separator;
   a first joining device arranged in the downstream of the positive electrode feeding device and the first separator feeding device, wherein the first joining device joins the positive electrode plate and the first separator to form a positive electrode composite plate body;
   a negative electrode feeding device for outputting a negative electrode plate;
   a second separator feeding device for outputting a second separator;

a second joining device arranged in the downstream of the negative electrode feeding device and the second separator feeding device, wherein the second joining device joins the negative electrode plate and the second separator to form a negative electrode composite plate body;

a winding device arranged in the downstream of the first joining device and the second joining device, wherein the winding device winds the positive electrode composite plate body and the negative electrode composite plate body to form an electrode assembly, wherein the apparatus further comprises a positive electrode plate cutter, the positive electrode plate cutter is arranged in the upstream of the first joining device, and the positive electrode plate cutter is configured for cutting off the positive electrode plate in the upstream of the joining position of the positive electrode plate and the first separator; and/or the apparatus further comprises a negative electrode plate cutter, the negative electrode plate cutter is arranged in the upstream of the second joining device, and the negative electrode plate cutter is configured for cutting off the negative electrode plate in the upstream of the joining position of the negative electrode plate and the second separator.

2. The apparatus for manufacturing an electrode assembly of a secondary battery according to claim 1, wherein the apparatus further comprises a first dust removal device, the first dust removal device is arranged in the upstream of the first joining device, and the first dust removal device is configured for performing a dust removal process for the positive electrode plate and/or the first separator before joined; and/or the apparatus further comprises a second dust removal device, the second dust removal device is arranged in the upstream of the second joining device, and the second dust removal device is configured for performing a dust removal process for the negative electrode plate and/or the second separator before joined.

3. The apparatus for manufacturing an electrode assembly of a secondary battery according to claim 1, wherein the winding device comprises a winding needle, a positive electrode roll-in guide roller group and a negative electrode roll-in guide roller group, the positive electrode roll-in guide roller group and the negative electrode roll-in guide roller group are both arranged in the upstream of the winding needle, the positive electrode roll-in guide roller group and the negative electrode roll-in guide roller group are both arranged below the winding needle, the positive electrode roll-in guide roller group directly conveys the positive electrode composite plate body from bottom to top to the winding needle, and the negative electrode roll-in guide roller group directly conveys the negative electrode composite plate body from bottom to top to the winding needle.

4. The apparatus for manufacturing an electrode assembly of a secondary battery according to claim 3, wherein the winding device further comprises a rotating base and two or more winding needles, and the two or more winding needles arranged on the rotating base at intervals around a rotation axis of the rotating base.

5. The apparatus for manufacturing an electrode assembly of a secondary battery according to claim 1, wherein the apparatus further comprises a first glue pasting device, the first glue pasting device is arranged in the downstream of the first joining device, and the first glue pasting device is configured for joining the composite starting end and/or the composite ending end of the positive electrode plate to the first separator; and/or the apparatus further comprises a second glue pasting device, the second glue pasting device is arranged in the downstream of the second joining device, and the second glue pasting device is configured for joining the composite starting end and/or the composite ending end of the negative electrode plate to the second separator.

6. The apparatus for manufacturing an electrode assembly of a secondary battery according to claim 1, wherein the apparatus further comprises a first detection device, the first detection device is arranged in the downstream of the first joining device, and the first detection device is configured for detecting a composite alignment degree of the positive electrode plate and the first separator; and/or the apparatus further comprises a second detection device, the second detection device is arranged in the downstream of the second joining device, and the second detection device is configured for detecting a composite alignment degree of the negative electrode plate and the second separator.

7. The apparatus for manufacturing an electrode assembly of a secondary battery according to claim 6, wherein the apparatus further comprises a first correction device, the first correction device is arranged in the upstream of the first joining device, and the first correction device is configured for adjusting the relative position of the positive electrode plate and the first separator; and/or the apparatus further comprises a second correction device, the second correction device is arranged in the upstream of the second joining device, and the second correction device is configured for adjusting the relative position of the negative electrode plate and the second separator.

8. The apparatus for manufacturing an electrode assembly of a secondary battery according to claim 1, further comprising a tension adjusting device, wherein the tension adjusting device is disposed in the upstream of the winding device for adjusting a degree of tension of the positive electrode composite plate body or the negative electrode composite plate body.

* * * * *